L. D. WADE.
NUT LOCK.
APPLICATION FILED AUG. 26, 1911.

1,030,146. Patented June 18, 1912.

Witnesses

Inventor
Lemuel D. Wade
By Victor J. Evans
Attorney

COLUMBIA PLANOGRAPH CO., WASHINGTON, D. C.

UNITED STATES PATENT OFFICE.

LEMUEL D. WADE, OF PAUL, ALABAMA.

NUT-LOCK.

1,030,146.	Specification of Letters Patent.	Patented June 18, 1912.

Application filed August 26, 1911. Serial No. 646,104.

*To all whom it may concern:*

Be it known that I, LEMUEL D. WADE, a citizen of the United States, residing at Paul, in the county of Conecuh and State of Alabama, have invented new and useful Improvements in Nut-Locks, of which the following is a specification.

The general object of the invention is to lock a nut against turning movement in either direction on a bolt.

Figure 1:
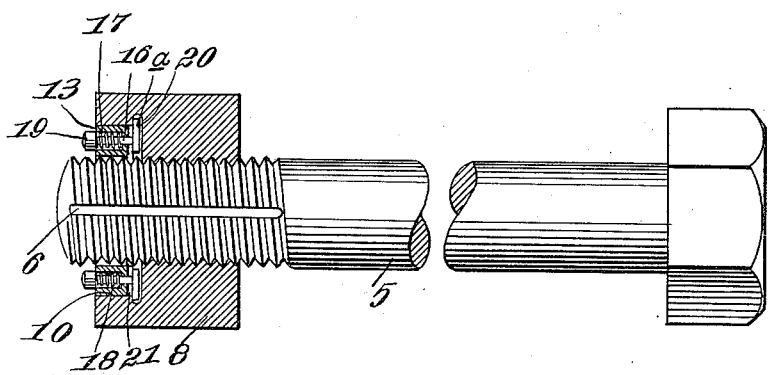
Figure 2:
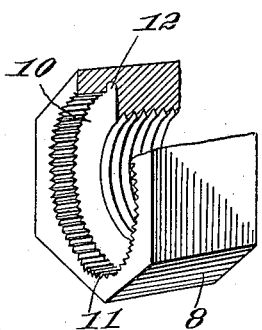
Figure 3:
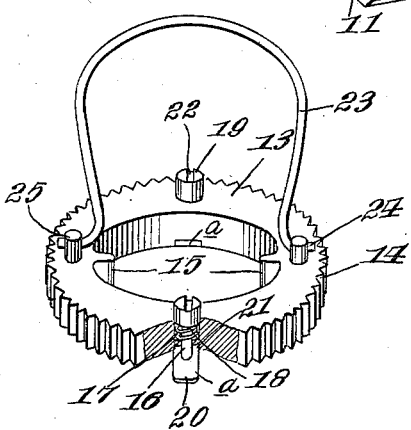
Figure 4:
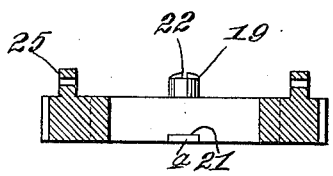

Other objects will appear and be better understood from the following description taken in connection with the accompanying drawings, in which, Figure 1 is a side elevation of the device partly in section. Fig. 2 is a detail perspective of the nut a portion of the side wall thereof being broken away to disclose the groove. Fig. 3 is a detail perspective of the washer partly in section also showing the means for withdrawing the washer from the bolt. Fig. 4 is a detail cross section of the washer.

5 indicates the bolt and 6 longitudinal grooves extending through the threaded portion of the bolt.

8 indicates the nut which is adapted to be screwed onto the bolt. The outer end of the nut has a counter-bore 10 the wall of which is provided with a plurality of teeth 11 and a groove or channel 12 located inwardly of the teeth 11.

13 indicates a washer adapted to be harbored in the counter-bore 10 and having peripheral teeth 14 to interlock with the teeth 11.

15 indicates inwardly extending lugs which are adapted to be received by the grooves 6 of the bolt so as to prevent turning movement of the bolt or washer, the interlocking teeth 11 and 14 serving to prevent turning movement of the nut.

*a* indicates a pair of dogs, the shanks 16 of which are loosely received in counter-bore openings 17 in the washer. Springs 18 surround the shanks 16 and bear at one end on the inner ends of the counter-bore and at their opposite ends on the heads 19, whereby, to move the shanks outwardly so that the engaging ends 20 of the dogs will be normally held in recesses 21 in the inner face of the washer. The engaging ends 20 are adapted to be received by the groove 12 of the nut when turned so as to enter the recesses 21.

In use, the nut is screwed onto the bolt in the ordinary manner. The dogs *a* are then turned with a suitable implement such as a screw driver, which is inserted into the recesses 22 of the heads 19 so as to move the engaging ends 20 to a position transversely of the recesses 21. In order to accomplish this result it will be necessary to press inwardly on the heads 19 so that the engaging ends 20 will move beyond the recesses 21. This will have the effect of tensioning the springs 18 so that when the engaging ends have been turned, the springs will be held compressed. In this connection it will also be observed that when the engaging ends are turned transversely of the recesses 21, they will not extend beyond the periphery of the washer. The washer may now be inserted into the counter-bore 10 so that the lugs 15 will enter the groove 6 and the teeth 11 interlock with the teeth 14, after which the dogs are turned until the engaging ends thereof enter the groove 12 and aline with the recesses 21, whereupon the springs will force the dogs outwardly, thus to prevent accidental displacement of the washer.

In order to remove the nut, the dogs are first turned to the positions they occupy before the insertion of the washer and as previously described. A suitable tool, such as a bail 23 having out-turned ends 24 to enter openings in studs 25 carried by the washer, is then arranged in the position shown, after which the washer may be removed by pulling outwardly on the bail. This done, the nut may be unscrewed from the bolt.

Although I have shown and described one embodiment of my invention it is to be understood that I am not to be limited to the specific description and arrangement of parts, since various changes will be made within the scope of the appended claims without departing from the spirit or sacrificing any of the advantages of the invention.

What I claim as new is:

1. In a nut lock, in combination with a bolt, a washer, and coöperating interlocking structures associated with the parts; of a grooved nut adapted to be screwed onto the bolt and further adapted to harbor the washer, and a locking dog carried by the washer and adapted to be received by the groove of the nut.

2. In a nut lock, in combination with a bolt, a washer, and coöperating interlocking structures associated with the parts; of a grooved nut adapted to be screwed onto the bolt and further adapted to harbor the washer, and a spring-pressed locking dog carried by the washer and adapted to be received by the groove of the nut.

3. In a nut lock, in combination with a grooved bolt; of a toothed washer having means to be received by the groove of the bolt, a grooved nut adapted to be screwed onto the bolt and further adapted to harbor the washer and interlock with the teeth thereof, and a rotatable spring-pressed locking dog carried by the washer and adapted to be received by the groove of the nut.

In testimony whereof I affix my signature in presence of two witnesses.

LEMMIE D. WADE.

Witnesses:
S. P. DUNN,
C. B. SAVAGE.

Copies of this patent may be obtained for five cents each, by addressing the "Commissioner of Patents, Washington, D. C."